United States Patent [19]

Heima

[11] Patent Number: 4,771,607

[45] Date of Patent: Sep. 20, 1988

[54] COOLING METHOD AND APPARATUS WITH SOFT BURNT LIME ADSORBENT

[75] Inventor: Haruo Heima, Ichikawa, Japan

[73] Assignee: Shinagawa Fuel Co., Ltd., Japan

[21] Appl. No.: 99,500

[22] Filed: Sep. 22, 1987

[30] Foreign Application Priority Data

Sep. 24, 1986 [JP] Japan .................................. 61-225183

[51] Int. Cl.[4] ............................................. F17C 11/00
[52] U.S. Cl. .......................................... 62/48; 62/100; 62/268
[58] Field of Search ............................ 62/48, 100, 268

[56] References Cited

U.S. PATENT DOCUMENTS

| | | | |
|---|---|---|---|
| Re. 20,969 | 1/1939 | Reichel | 62/100 |
| 1,966,265 | 7/1934 | Schmelkes | 62/48 |
| 2,023,444 | 10/1935 | Roe | 62/100 |
| 3,967,465 | 7/1976 | Asselman et al. | 62/48 |
| 4,402,915 | 9/1983 | Nishizaki et al. | 62/48 |
| 4,559,790 | 12/1985 | Houston | 62/259.3 |
| 4,566,281 | 1/1986 | Sandrock et al. | 62/48 |

*Primary Examiner*—Ronald C. Capossela
*Attorney, Agent, or Firm*—Jacobs & Jacobs

[57] ABSTRACT

A method for cooling a material in contact with a cooling medium comprises evaporating water contained in the cooling medium and adsorbing the evaporated water to soft burnt lime and causing the evaporation and the adsorption to be carried out under a reduced pressure to cool the material. An apparatus for carrying out the method is provided.

23 Claims, 3 Drawing Sheets

COOLING METHOD AND APPARATUS WITH SOFT BURNT LIME ADSORBENT

BACKGROUND OF THE INVENTION

1. Field of the Invention

The present invention relates to a cooling method and apparatus and in particular to a simple cooling method and apparatus in which soft burnt lime is used as an adsorbent.

2. Description of the Prior Art

Hitherto, there has been known a cooling method by means of a heat pump in which an adsorbent is used. For example, a cooling method in which zeolite is used as such an adsorbent is known in the field of air conditioning and refrigeration.

However, the adsorptivity of zeolite is not so high in the low vapour pressure region (eg., 5% by weight at 1 mmHg and 100° C.) and, therefore there is a problem that a relatively large amount of zeolite is required for cooling a unit weight of a specific material to be cooled. In addition, there is another problem that the adsorptivity of zeolite is remarkably reduced due to the generation of heat accompanied by the adsorption of water.

SUMMARY OF THE INVENTION

An object of the present invention is to provide a cooling method using an improved adsorbent adsorbing a large amount of water per unit weight thereof.

Another object of the present invention is to provide a cooling method using an improved adsorbent which keeps a desired adsoptivity irrespective of the generation of heat accompanied by the adsorption of water.

A further object of the present invention is to provide a cooling apparatus applying the cooling method using the improved adsorbent.

The inventors of the present invention found an adsorbent which makes it possible to eliminate the aforementioned problems associated with zeolite used as the adsorbent for a chemical heat pump, adsorb a large amount of water per unit weight thereof, and maintain a desired absorptivity irrespective of the generation of heat accompanied by the adsorption of water, and thus completed the present invention.

Accordingly, the present invention relates to a method for cooling a material which contacts with a cooling medium which comprises evaporating water contained in the cooling medium and adsorbing the evaporated water to soft burnt lime and causing the evaporation and the adsorption to be carried out under a reduced pressure to cool the material.

DETAILED DESCRIPTION OF THE INVENTION

The present invention will hereunder be explained in more detail.

In the present invention, soft burnt lime is used as the adsorbent. The soft burnt lime is also referred to as lightburnt lime and is generally prepared by calcining limestone at a temperature of about 800° to 1100° C., preferably about 850° to 1050° C. under atmospheric pressure. The soft burnt lime is porous since it has a volume approximately equal to that of the starting limestone and $CO_2$ is released from the starting limestone during calcination. In other words, the resultant CaO is in a fine crystalline state, has a large void volume and a low bulk density and is highly reactive.

In this connection, the method of preparing a soft burnt lime is not restricted to any specific one in the present invention. Therefore, the soft burnt lime as used herein also includes CaO obtained by decomposition of $CaCO_3$ or $Ca(OH)_2$ at a temperature of about 300° to 800° C., preferably about 300° to 500° C. under a reduced pressure, in vacuo or in the presence of a carrier gas such as $N_2$ gas. For example, CaO with a large specific surface area, which is called reactive powder, disclosed in the paper of ARAI et al., Gypsum & Lime, 1982, No. 178, pp. 31–40 may also be used in the present invention. Such CaO is preferred since it has a large specific surface area, is highly reactive and has a highly improved cooling capacity per unit weight thereof.

In the present invention, the soft burnt lime is distinguished from hard burnt lime which is produced by calcining at a high temperature of not less than about 1200° C. and has a low specific surface area and a low reactivity.

In the present invention, any cooling medium may be used as long as it contains water. Examples thereof include water per se and brines such as aqueous solutions of sodium chloride and calcium chloride.

Figure 1:
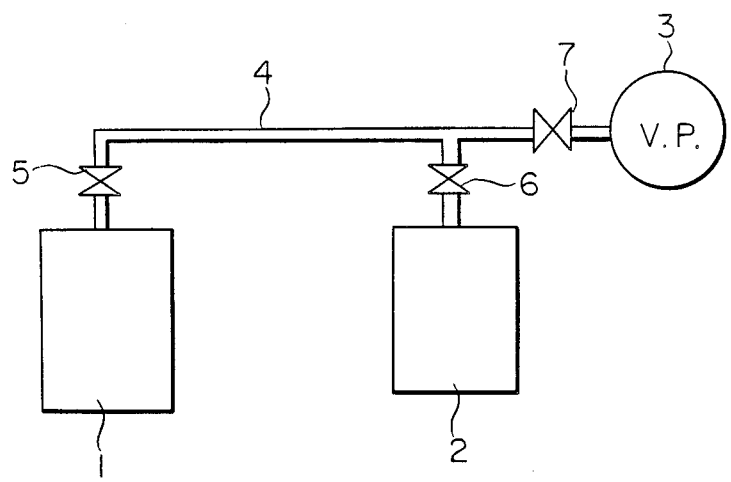
FIGS. 1 and 2 are schematic diagrams for illustrating the apparatus employed to carry out the method of this invention.

The method according to the present invention can be carried out as follows:

For instance, the method of the present invention can be carried out utilizing the apparatus illustrated schematically in FIG. 1. The apparatus shown in FIG. 1 comprises:

an adsorption chamber 1 containing soft burnt lime as the adsorbent;
an evaporation chamber 2 which contains a cooling medium and a material to be cooled;
a vacuum pump 3 for reducing the pressure of the adsorption chamber 1 and the evaporation chamber 2;
a path 4 for communicating the vacuum pump 3 with the adsorption chamber 1 and the evaporation chamber 2; and
valves 5, 6 and 7 mounted on the path 4.

First of all, the pump is started and the valves 5 and 7 are opened while the valve 6 is closed to reduce the pressure in the adsorption chamber 1. After the pressure in the adsorption chamber 1 is reduced to a desired value, the valve 5 is closed and the valve 6 is opened to reduce the pressure in the evaporation chamber 2. Thus, the pressure in the evaporation chamber 2 is reduced to a desired value. Then, the valve 7 is closed and the valve 5 is opened to communicate the adsorption chamber 1 with the evaporation chamber 2 through the path 4. In the evaporation chamber 2, water included in the cooling medium evaporates while absorbing sensible heat from the material to be cooled, the evaporated water arrives at the adsorption chamber 1 through the path 4 and is adsorbed to the soft burnt lime. The material is cooled by maintaining the system under such condition for a desired period of time.

In the method of the present invention, it is preferred to reduce the pressure in the adsorption chamber 1 and the evaporation chamber 2 down to 0.1 to 30 torr, preferably 0.5 to 10 torr.

Figure 2:
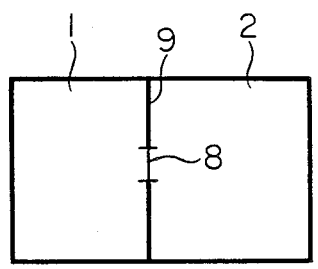

The method of the present invention may be carried out according to various other manners than that using the apparatus shown in FIG. 1. For example, as shown in FIG. 2, an integral container is divided into two compartments by a partition 9, one of which serves as an adsorption chamber 1 and the other of which serves as an evaporation chamber 2. Furthermore, the partition 9 is provided with a valve 8. Within such a container, each of the soft burnt lime as the adsorbent, and a cooling medium and a material to be cooled are previously charged in the adsorption chamber 1 and the evaporation chamber 2, respectively. The container is sealed while reducing the pressure therein, and the valve 8 is then opened to cool the material as in the case explained above.

In the present invention, the soft burnt lime contained in the adsorption chamber may be agglomerated (or granulated) or may be formed into a desired shape. Powdered form thereof may also be used without causing any troubles. Moreover, if the soft burnt lime is wrapped up in cloth or wire gauze to form a sheet having a thickness of 2 to 20 mm, preferably 5 to 10 mm, the soft burnt lime becomes very easy to handle and a proper diffusion of water vapour therein can be established.

In addition, the cooling medium may be in the form of liquid per se or may be absorbed on a substance having appropriate water absorption properties. Examples of such substance having water retention characteristics include polymers (polyelectrolyte hydrogel) having water absorption properties.

When the cooling medium is used in the form of liquid per se, the contact between the cooling medium and the material to be cooled is assured by charging the cooling medium around the material to be cooled. On the other hand, when the cooling medium is used in the state absorbed on a polymer having water absorption properties, the contact between the cooling medium and the material to be cooled is assured by winding the polymer round the material to be cooled or round a container containing the material.

According to the method of this invention, a large amount of material can be cooled with a relatively small amount of the adsorbent. Therefore, it is useful as a cooling system to be attached to containers for beer, wine, juice, cooling beverages and the like. Moreover, portable refrigerators may be realized by making use of the method according to the present invention.

EXAMPLE

The present invention will hereunder be explained in more detail with respect to the following examples.

Figure 3:
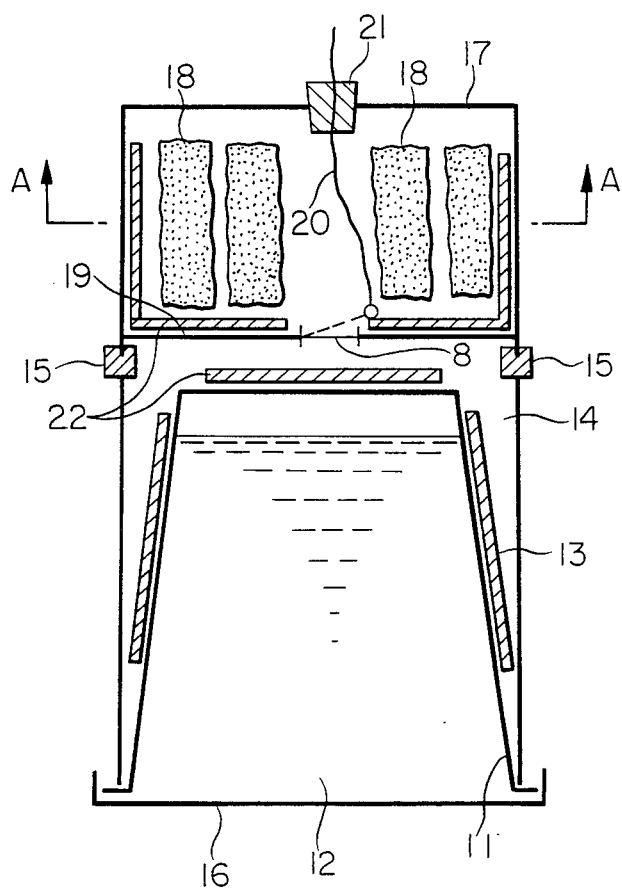
FIG. 3 is sectional view of an embodiment of the apparatus for carrying out the method of the present invention.

This example was carried out by employing the apparatus shown in FIG. 3. FIG. 3 shows a sectional view of an apparatus of a cylindrical shape.

A material 12 to be cooled is charged in a container 11 (a single-walled can) for receiving the material, the outside of which is wound with cloth or sheet 13 impregnated with a cooling medium such as water or brine and the space 14 (within a double-walled can) is in the condition of saturated vapour pressure. The container 11 has a lid 16.

Figure 4:
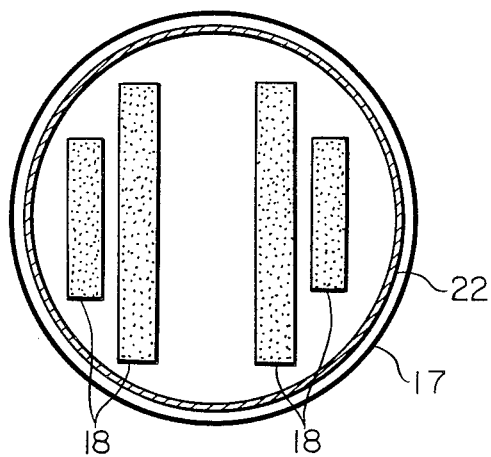
FIGS. 4 and 5 are sectional views of two different embodiments of the apparatus shown in FIG. 3 taken along the line A—A.
Figure 5:
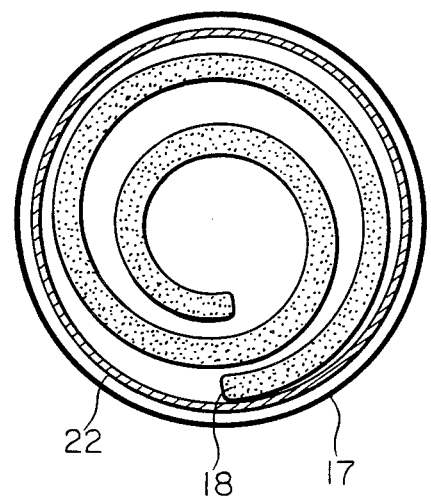

An adsorption chamber 17 (a triple-walled can) contains soft burnt lime. The soft burnt lime is wrapped up in cloth or wire gauze 18 of fine mesh in order to be formed into a thin layer having a thickness of 5 to 20 mm and the thin layer has a plate-like or spiral shape (see FIGS. 4 and 5). The cloth or the wire gauze plays an important role in preventing consolidation of the soft burnt lime as well as in promoting the diffusion of vapour therein.

The single-walled can 11, the double-walled can 14 and the triple-walled can 17 are independent systems. The single-walled can 11 is under ordinary temperature and pressure conditions, the double-walled can 14 is in the state of ordinary temperature and vapour presure of the cooling medium, and the triple-walled can 17 is in the state of ordinary temperature and a reduced pressure condition.

The double-walled can 14 and the triple-walled can 17 are separated by a partition 19 with a valve 8, however, these cans can be communicated with one another by pulling a wire 20 through a rubber plug 21 to open a valve 8 at the time of application. A packing 15 is disposed to make more difficult the transfer of heat generated by the soft burnt lime from the triple-walled can to the single-walled and double-walled cans. The double-walled can (the space 14) is in the condition of a reduced pressure during use and there is almost no air in the space. Therefore, heat transfer from the space to the single-walled can 11 due to the convection is prevented.

When the wire 20 is externally pulled upon cooling, the valve 8 on the partition 19 is opened, the water vapour in the double-walled can flows into the triple-walled can and the vapour reacts with the adsorbent contained therein.

$$CaO + H_2O = Ca(OH)_2 + 15200 \text{ cal}$$

At the same time, the double-walled can 14 is in the state of a reduced pressure, the evaporation of the cooling medium commences at the surface of the cloth or the sheet 13 and the cloth or the sheet per se is cooled. When the cloth or the sheet 13 is cooled, the single-walled can and then the material 12 to be cooled are in turn cooled.

Thus, the cooling of the material to be cooled 12 is commenced by pulling the wire 20 externally and is continued till adsorption equilibrium is established between the soft burnt lime and the cooling medium and thus there is no longer observed any transfer of the vapour therebetween. The temperature of the soft burnt lime is raised up to 200° to 300° C. due to the heat of reaction during use. However, the capacity of adsorption thereof remains unchanged up to the decomposition temperature of the products (decomposition temperature of $Ca(OH)_2$ is 450° C.), which is different from the case of physical adsorption.

In addition, in order to protect the user from burns, a heat reflection plate 22 may be placed on the internal wall of the triple-walled can.

The method of the present invention was carried out utilizing a can commercially available (diameter = 53 mm; height = 88 mm) containing 165 g of juice as the single-walled can, and cans for fruit (diameter = 84 mm; height = 115 mm) as the double-walled and the triple-walled cans respectively.

| The Material to be Cooled | Water |
| --- | --- |
| Weight | 165 g |
| Initial Temperature | 25° C. |
| Final Temperature (15 minutes later) | 5° C. |

-continued

| Cooling medium | 5% Aqueous solution of NaCl |
| Support for Cooling Medium | Dishcloth of pulp |
| Adsorbent | Soft Burnt CaO |
| Weight | 105 g |
| (The soft burnt lime used was obtained by decomposing JIS primary grade calcium carbonate at about 860° C.). | |
| Thickness | 6 mm |
| Material for wrapping | Wire Gauze of 200 mesh |

| Pressure | Double-walled Can (torr) | Triple-walled Can (torr) |
| --- | --- | --- |
| Initial Pressure | 24 | 0.4 |
| Final Pressure | 0.4 | 0.4 |

ADVANTAGES OF THE INVENTION

According to the method of the present invention, a large amount of material can be cooled by using a relatively small amount of adsorbent since soft burnt lime is used as the adsorbent.

What is claimed is:

1. A method of cooling a material, comprising the steps of:
   (a) positioning a cooling medium containing water in a heat transfer relation with a material to be cooled;
   (b) preparing a soft burnt lime adsorbent;
   (c) reducing ambient pressure surrounding the cooling medium and the soft burnt lime adsorbent;
   (d) evaporating the water from the cooling medium under a reduced pressure to form evaporated water, and drawing heat from the material to be cooled;
   (e) conveying the evaporated water away from the cooling medium to the soft burnt lime adsorbent;
   (f) adsorbing the evaporated water conveyed to the soft burnt lime adsorbent on the adsorbent under a reduced pressure; and
   (g) continuing the evaporating and adsorbing steps until the material has been cooled to a desired temperature.

2. The method according to claim 1, wherein the reducing step is performed by reducing the ambient pressure surrounding the cooling medium and the soft burnt lime adsorbent to a range from 0.1 to 30 torr.

3. The method according to claim 1, wherein the reducing step is performed by reducing the ambient pressure surrounding the cooling medium and the soft burnt lime adsorbent to a range from 0.5 to 20 torr.

4. The method according to claim 1, wherein the positioning step is performed by utilizing water as the cooling medium.

5. The method according to claim 1, wherein the positioning step is performed by utilizing brine as the cooling medium.

6. The method according to claim 1, wherein the positioning step is performed by absorbing the cooling medium on a carrier having a water absorption characteristic.

7. The method according to claim 6, wherein the carrier is a water absorbable polymer.

8. The method according to claim 1, wherein the preparing step is performed by calcining limestone at a temperature in a range from 800° to 1100° C.

9. The method according to claim 1, wherein the preparing step is performed by calcining limestone at a temperature in a range from 850° to 1050° C.

10. The method according to claim 1, wherein the preparing step is performed by calcining slaked lime at a temperature in a range from 500° to 800° C.

11. An apparatus for cooling a material, comprising:
    (a) an adsorption chamber;
    (b) an evaporation chamber for containing a cooling medium having water;
    (c) means for positioning the cooling medium in a heat transfer relation with a material to be cooled;
    (d) means for drawing heat from the material to be cooled, including means for reducing ambient pressure in the evaporation chamber to enable the water from the cooling medium to evaporate under a reduced pressure, thereby forming evaporated water;
    (e) means for conveying the evaporated water away from the evaporation chamber to the adsorption chamber; and
    (f) means for adsorbing the evaporated water conveyed to the adsorption chamber, including means for reducing ambient pressure in the adsorption chamber, and a soft burnt lime adsorbent within the adsorption chamber and operative for adsorbing the evaporated water under a reduced pressure, until the material has been cooled to a desired temperature.

12. The apparatus according to claim 11 wherein the reduced pressure of the adsorption chamber and the evaporation chamber is 0.1 to 30 torr.

13. The apparatus according to claim 11 wherein the reduced pressure of the adsorption chamber and the evaporation chamber is 0.5 to 20 torr.

14. The apparatus according to claim 11 wherein the cooling medium is water.

15. The apparatus according to claim 11, wherein the cooling medium is on a carrier.

16. The apparatus according to claim 15 wherein the carrier has a water absorption property.

17. The apparatus according to claim 15 wherein the carrier is a water absorbable polymer impregnated with the cooling medium.

18. The apparatus according to claim 11, wherein the cooling medium is brine.

19. The apparatus according to claim 11, wherein the evaporation chamber surrounds a container in which the material to be cooled is accommodated, and wherein the positioning means includes a carrier for carrying the cooling medium, said carrier being wrapped about and contacting the container.

20. The apparatus according to claim 11, wherein the soft burnt lime adsorbent is mounted on a coiled carrier.

21. The apparatus according to claim 11, wherein the soft burnt lime adsorbent is mounted on a carrier configured as a plurality of plate-like strips.

22. The apparatus according to claim 11, wherein the adsorption and evaporation chambers are separated by a partition, and wherein the conveying means includes an openable valve mounted on the partition for permitting communication between the chambers upon opening of the valve.

23. The apparatus according to claim 11, and further comprising heat shielding means interposed between the soft burnt lime adsorbent and the material to be cooled, for resisting heat transfer from the adsorbent to the material.

* * * * *